will be observed, to set the gauge to act against greater or less resistance from spring 72, and thereby to change the range of differential pressures the gauge is adapted to measure. This will usually be a factory adjustment, made at the time the scale for the indicator 48 is selected, the adjustment 56 being the only one which usually requires setting in the field.

As a low-cost but highly accurate means of sealing or packing the joint between the wire 74 and the casing part 12, after the wire 74 is tensioned and its position is definitely fixed (and while the parts are turned over so that the whole instrument is upside down as compared to Figure 1) a drop or plug 82 of soft lead-tin solder is deposited on the casing part 12 over the opening therein, and about the wire 74.

The plug of solder adheres to the casing part 12 and closely slidably embraces the wire 74. If any bond at all is formed between the wire 74 and the solder 82, it is a very weak bond and is readily broken by pulling on the wire in a direction tending to hold the solder plug 82 against its seat on the casing part 12.

While one illustrative construction has been described in detail, it is not my intention to limit the scope of the invention to that particular construction, or otherwise than by the terms of the appended claims.

I claim:

1. A draft gauge or the like comprising an adjustable bracket, an indicator mounted adjacent said bracket, a lever mounted on the bracket and operatively connected to the indicator, a pressure chamber mounted on the bracket and formed with an opening opposite a part of said lever, a diaphragm dividing said chamber into two parts, springs on opposite sides of the diaphragm in said chamber and which balance against each other, means for connecting two sources of pressure to said two parts of the pressure chamber, a nichrome wire tensioned between the diaphragm and said part of the lever and which passes through said opening, and a plug of soft solder deposited over said opening and adhering to the wall of the pressure chamber and closely slidably embracing said wire.

2. A draft gauge or the like comprising an adjustable bracket, an indicator mounted adjacent said bracket, a lever mounted on the bracket and operatively connected to the indicator, a pressure chamber mounted on the bracket and formed with an opening opposite a part of said lever, a diaphragm dividing said chamber into two parts, springs on opposite sides of the diaphragm in said chamber and which balance against each other, means for connecting two sources of pressure to said two parts of the pressure chamber, a wire tensioned between the diaphragm and said part of the lever and which passes through said opening, and packing means adhering to the wall of the pressure chamber and closely slidably embracing said wire.

3. In a gauge or the like comprising a chamber containing an operating diaphragm and formed with an opening in its wall opposite the center of the diaphragm and operated means opposite said opening, a nichrome wire passing through said opening and connecting said operated means to the center of said diaphragm, and a plug of tin-lead soft solder deposited over said opening and adhering to the wall of the chamber and closely slidably embracing said wire.

4. In a gauge or the like comprising a chamber containing an operating diaphragm and formed with an opening in its wall opposite the diaphragm and operated means opposite said opening, a wire passing through said opening and connecting said operated means to said diaphragm, and a plug of solder deposited over said opening and adhering to the wall of the chamber and closely slidably embracing said wire.

5. A draft gauge or the like comprising an adjustable bracket, an indicator mounted adjacent said bracket, a lever mounted on the bracket and operatively connected to the indicator, a pressure chamber mounted on the bracket and formed with an opening opposite a part of said lever, a diaphragm dividing said chamber into two parts, springs on opposite sides of the diaphragm in said chamber and which balance against each other, means for connecting two sources of pressure to said two parts of the pressure chamber, a wire tensioned between the diaphragm and said part of the lever and which passes through said opening, and packing means adhering to the wall of the pressure chamber and closely slidably embracing said wire, said wire being connected to the lever by a part about which the wire is wound and which is arranged to be turned to take up on the wire to change the range of operation of the gauge.

GEORGE W. GRISDALE.